United States Patent
Lee et al.

(10) Patent No.: US 11,472,475 B2
(45) Date of Patent: Oct. 18, 2022

(54) CONTROL APPARATUS AND METHOD FOR CATCH-UP REDUCTION IN MOTOR DRIVEN POWER STEERING SYSTEM

(71) Applicants: Hyundai Motor Company, Seoul (KR); Kia Motors Corporation, Seoul (KR)

(72) Inventors: Seong Hack Lee, Gyeonggi-do (KR); Sang Woock Ryu, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 151 days.

(21) Appl. No.: 16/180,802

(22) Filed: Nov. 5, 2018

(65) Prior Publication Data

US 2019/0176878 A1  Jun. 13, 2019

(30) Foreign Application Priority Data

Dec. 8, 2017 (KR) .................. 10-2017-0168258

(51) Int. Cl.
*B62D 6/00* (2006.01)
*B62D 5/04* (2006.01)
(Continued)

(52) U.S. Cl.
CPC ............ *B62D 6/00* (2013.01); *B62D 5/0463* (2013.01); *B62D 5/0481* (2013.01); *B62D 6/008* (2013.01);
(Continued)

(58) Field of Classification Search
CPC combination set(s) only.
See application file for complete search history.

(56) References Cited

U.S. PATENT DOCUMENTS 6,768,283 B2   7/2004  Tanaka et al.
7,591,342 B2 * 9/2009  Ozsoylu .................. B62D 5/04
                                                       180/444
(Continued)

FOREIGN PATENT DOCUMENTS

JP   2002-337707 A   11/2002
JP   2004-217045 A    8/2004
(Continued)

*Primary Examiner* — Jess Whittington
*Assistant Examiner* — Terry C Buse
(74) *Attorney, Agent, or Firm* — Fox Rothschild LLP

(57) ABSTRACT

A control apparatus and method of a motor-driven power steering system are provided. The apparatus and method are capable of suppressing catch-up that occurs at a high steering speed even without using an expensive motor, thereby contributing to improving commercial value and reducing the manufacturing cost of a vehicle. The method includes determining a target steering speed using driver-steering input information and vehicle state information and determining the target steering speed corresponds to a condition for avoiding catch-up using the determined target steering speed. A current compensation value is then determined for reducing catch-up using the target steering speed in response to determining that is the target steering speed corresponds a condition for avoiding catch-up and motor current is compensated with the current compensation value.

18 Claims, 8 Drawing Sheets

(51) Int. Cl.
*H02P 29/40* (2016.01)
*H02P 29/60* (2016.01)
*B62D 15/02* (2006.01)

(52) U.S. Cl.
CPC ............ *B62D 15/021* (2013.01); *H02P 29/40*
(2016.02); *H02P 29/60* (2016.02)

(56) References Cited

U.S. PATENT DOCUMENTS

| | | | | |
|---|---|---|---|---|
| 10,214,238 | B2 * | 2/2019 | Wijffels | B62D 5/0481 |
| 2007/0017973 | A1 * | 5/2007 | Jiang | B62D 5/04 |
| | | | | 180/443 |
| 2007/0107973 | A1 * | 5/2007 | Jiang | B62D 5/046 |
| | | | | 180/443 |
| 2007/0288143 | A1 * | 12/2007 | Arima | B62D 15/0285 |
| | | | | 701/41 |
| 2008/0264714 | A1 * | 10/2008 | Morikawa | B62D 5/0415 |
| | | | | 180/446 |
| 2009/0024281 | A1 * | 1/2009 | Hwang | B62D 6/008 |
| | | | | 701/41 |

FOREIGN PATENT DOCUMENTS

| | | | | | |
|---|---|---|---|---|---|
| JP | 2005-119417 | A | | 5/2005 | |
| JP | 2011-121474 | A | | 6/2011 | |
| JP | 2014-024472 | A | | 2/2014 | |
| JP | 2016-215864 | A | | 12/2016 | |
| JP | 2017-114254 | A | | 6/2017 | |
| KR | 10-2008-0104872 | A | | 12/2008 | |
| KR | 101646391 | B1 | | 8/2016 | |
| KR | 20180053888 | A | * | 11/2016 | ............ B62D 5/04 |
| KR | 20180053888 | A | * | 5/2018 | |

* cited by examiner (steering speed : 450deg/s)

CONTROL APPARATUS AND METHOD FOR CATCH-UP REDUCTION IN MOTOR DRIVEN POWER STEERING SYSTEM

CROSS REFERENCE TO RELATED APPLICATION(S)

This application claims the benefit of Korean Patent Application No. 10-2017-0168258, filed Dec. 8, 2017, which is hereby incorporated by reference in its entirety into this application.

BACKGROUND

1. Technical Field

The present invention relates to a control apparatus and method of a motor-driven power steering system and, more particularly, to a control apparatus and method for catch-up reduction in a motor-driven power steering system, the apparatus and method being able to effectively reduce or prevent catch-up, which occurs at a high steering speed.

2. Description of the Related Art

Various power steering systems have been developed for assisting the steering force applied by a driver to steer a vehicle, including a hydraulic power steering (HPS) system that assists the steering force applied by a driver, using hydraulic pressure generated by a hydraulic pump and a motor driven power steering system (hereafter, referred to as an MDPS system) that assists the steering force applied by a driver, using output torque of an electric motor.

The MDPS system is capable of adjusting the output torque (e.g., assist torque) of an electric motor (a steering motor) for steering assistance when performing the function of assisting a driver to operate a steering wheel based on the driving conditions of a vehicle, thus providing improved steering performance and steering feeling compared to a hydraulic steering system. Accordingly, the MDPS system capable of changing a steering assistant force, which is generated by output from a motor, in accordance with driving conditions is widely used in recently developed vehicles.

The MDPS system may include a steering angle sensor that detects a steering angle when a driver operates a steering wheel, a torque sensor that detects steering torque that is applied to the steering wheel by a driver, sensors such as a vehicle speed sensor that detects the vehicle speed, a controller (MDPS electronic control unit (ECU)), and a steering motor (MDPS motor). A wheel speed sensor, an engine revolutions per minute (RPM) sensor, a yaw rate sensor etc. may be additionally used as the sensors. The controller is configured to receive driver-steering input information such as a steering angle, a steering angular speed, and steering torque, that is, information regarding operation of a steering wheel, and information regarding vehicle states such as a vehicle speed, a wheel speed, an engine RPM, and a yaw rate, from the sensors to operate the steering motor.

The steering angle shows the rotational position of the steering wheel and the steering torque shows input torque by a driver, that is, torque applied to the steering wheel by a driver (e.g., torque applied to turn the steering wheel by a driver). The steering angular speed, which is an angular speed of a steering wheel acquired through a separate sensor or a differential signal of a steering angle sensor signal (a steering angle signal), refers to the speed of a steering wheel turned by a driver, that is, a steering speed. When steering torque that is input torque by a driver is detected by the torque sensor, the controller operates the steering motor based on the detected steering torque from the driver to generate assist torque for steering assistance.

In a common MDPS system, the output from a steering motor for assisting a steering force from a driver is controlled by adjusting motor current applied to the steering motor through a controller. The controller is configured to determine the motor current based on information collected from a vehicle such as steering torque detected by the torque sensor and a vehicle speed, and then applies the finally determined target current amount to the steering motor, in which an assist force that is the force for assisting the steering force from the driver is generated by operating the motor.

In a steering system, the configuration for transmitting a steering force applied by a driver through a steering wheel and an assist force generated by a motor may include a steering column coupled to the bottom of the steering wheel, a gear box that changes the direction of tires by converting torque from the steering column into a straight force, and a universal joint that transmits the torque from the steering column to the gear box. The gear box may include a pinion gear that receives torque from the universal joint and a rack bar having a rack engaged with the pinion gear.

When the pinion gear is rotated, the rack bar is moved straight to the left and right by the rack, in which the force generated by the left-right straight motion of the rack bar is transmitted to tires through a tie rod and a ball joint, thereby changing the direction of the tires. When a vehicle is stopped, the MDPS system applies current, which is in proportion to the input torque by a driver, that is, the steering torque detected by the torque sensor, to the motor to allow the driver to steer the vehicle with a minimal force.

However, the steering motor used in the MDPS system has a characteristic that the speed and the torque are inversely proportional, and thus, when a driver turns a steering wheel at a high speed, the motor torque is decreased and the assist force (e.g., force for steering assistance) provided from the motor is also reduced, causing the driver to feel substantial resistance when operating the steering wheel. In particular, when a driver turns a steering wheel at a high speed over a predetermined level, a substantial steering force is required at a specific steering angle, and thus the driver instantaneously feels the resistance of steering wheel (e.g., the steering wheel becomes heavier to operate).

This phenomenon is referred to as a catch-up and is described in more detail hereafter with reference to FIG. 1. FIG. 1 is a diagram showing a motor current value according to steering torque according to vehicle speeds in an MDPS system, in which the steering torque shows input torque applied to a steering wheel by a driver. As shown in FIG. 1, the lower the speed, the more the current should be applied to a steering motor at the same steering torque, and when a vehicle is stopped, the motor current is maximum at the same steering torque.

Particularly, the friction force between the surface of a road and tires are the largest, and thus, the assist torque (steering assistant torque) output from a steering motor should be greater than that when the vehicle is being driven to make a driver feel a constant steering force. However, since the motor has the characteristic that the torque and the speed are inversely proportional, when a driver turns a steering wheel rapidly with a vehicle stopped in which the torque for operating the steering wheel (e.g., steering torque required for a driver to operate the steering wheel) is the largest, catch-up occurs in which a driver instantaneously feels resistance of a steering wheel. Accordingly, the commercial value of the vehicle may be decreased and more expensive steering motors are required to solve this problem, which increases the manufacturing cost.

FIGS. 2 and 3 are hysteresis curves showing steering torque according to steering angle at different steering speeds, in which the steering torque refers to a force that is applied by a driver to operate a steering wheel to a desired steering angle, that is, a steering force. As shown in FIG. 2, when the steering speed is low (e.g., the steering speed is about 450 deg/s), catch-up does not occur, but when the steering speed is high (e.g., the steering speed is about 600 deg/s), as shown in FIG. 3, catch-up that instantaneously requires a large steering force at a specific steering angle may occur. Referring to FIG. 3, catch-up occurs at several steering angles while a driver turns a steering wheel, and a large steering force is required every time the catch-up occurs, thus causing the driver to feel a locking sensation of the wheel while turning the steering wheel.

SUMMARY

Accordingly, the present invention provides a control apparatus and method of a motor-driven power steering system, the apparatus and method being able to improve the commercial value of a vehicle and reduce the manufacturing cost by effectively reducing or preventing catch-up that occurs at a high steering speed even without requiring the use of an expensive motor.

In order to achieve the object, an aspect of the present invention provides a control apparatus for reducing catch-up in a motor-driven power steering system that may include; a plurality of sensors configured to detect driver-steering input information based on an operation of a steering wheel by a driver and vehicle state information; an MDPS fundamental logic unit configured to determine motor current based on an operation of the steering wheel by the driver from the driver-steering input information and the vehicle state information detected by the sensors; a catch-up reduction logic unit configured to determine a target steering speed using the driver-steering input information and the vehicle state information detected by the sensors, determine whether it is a condition for avoiding catch-up using the determined target steering speed, and determine a current compensation value for reducing catch-up using the target steering speed in response to detecting a condition for avoiding catch-up; and a compensation unit configured to compensate the motor current determined by the MDPS fundamental logic unit with the a current compensation value determined by the catch-up reduction logic unit.

Another aspect of the present invention provides a control method for reducing catch-up in a motor-driven power steering system that may include; acquiring in real time, by a controller, driver-steering input information and vehicle state information; determining, by the controller, motor current based on an operation of the steering wheel by the driver from the detected driver-steering input information and vehicle state information; determining, by the controller, a target steering speed using the determined driver-steering input information and vehicle state information; determining, by the controller, whether it is a condition for avoiding catch-up using the determined target steering speed; determining, by the controller, a current compensation value for reducing catch-up using the target steering speed is response to detecting a condition for avoiding catch-up; and compensating, by the controller, the motor current determined by a MDPS fundamental logic unit with the a current compensation value determined by the catch-up reduction logic unit.

Therefore, according to the control apparatus and method for reducing catch-up of the present invention, since it may be possible to maximize the performance of the MDPS system, using an inexpensive motor, the manufacturing cost may be reduced. In other words, since it may be possible to effectively reduce or prevent catch-up that occurs at a high steering system with a vehicle stopped, the commercial value of a vehicle may be improved and an inexpensive direct-current (DC) motor may be used without using an expensive motor, which contributes to reducing the manufacturing cost.

Further, according to the control apparatus and method of the present invention, since the steering force may be artificially adjusted based on the steering speed when a vehicle is stopped, it may be possible to prevent catch-up by avoiding a rapid locking feeling generation condition. A driver may also turn the steering wheel more smoothly compared to the related art, and thus, the commercial value of a vehicle may be improved. In particular, since the steering margin may be secured and the steering force is gradually increased by adjusting motor current such that the maximum current is not reached when the steering speed is increased, it may be possible to turn a steering wheel more smoothly without a locking feel. Further, the used current may also be reduced to prevent overheating of the motor.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
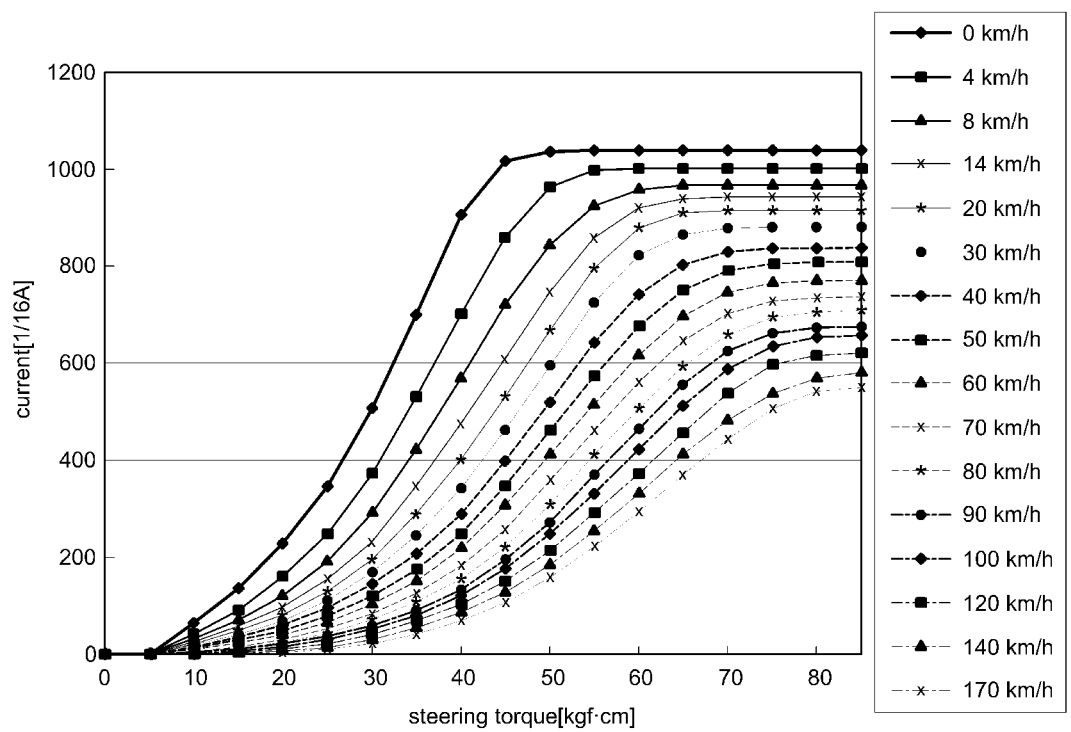
FIG. 1 is an exemplary view showing motor current value according to steering torque according to vehicle speeds in a motor-driven power steering system according to the related art.
Figure 2:
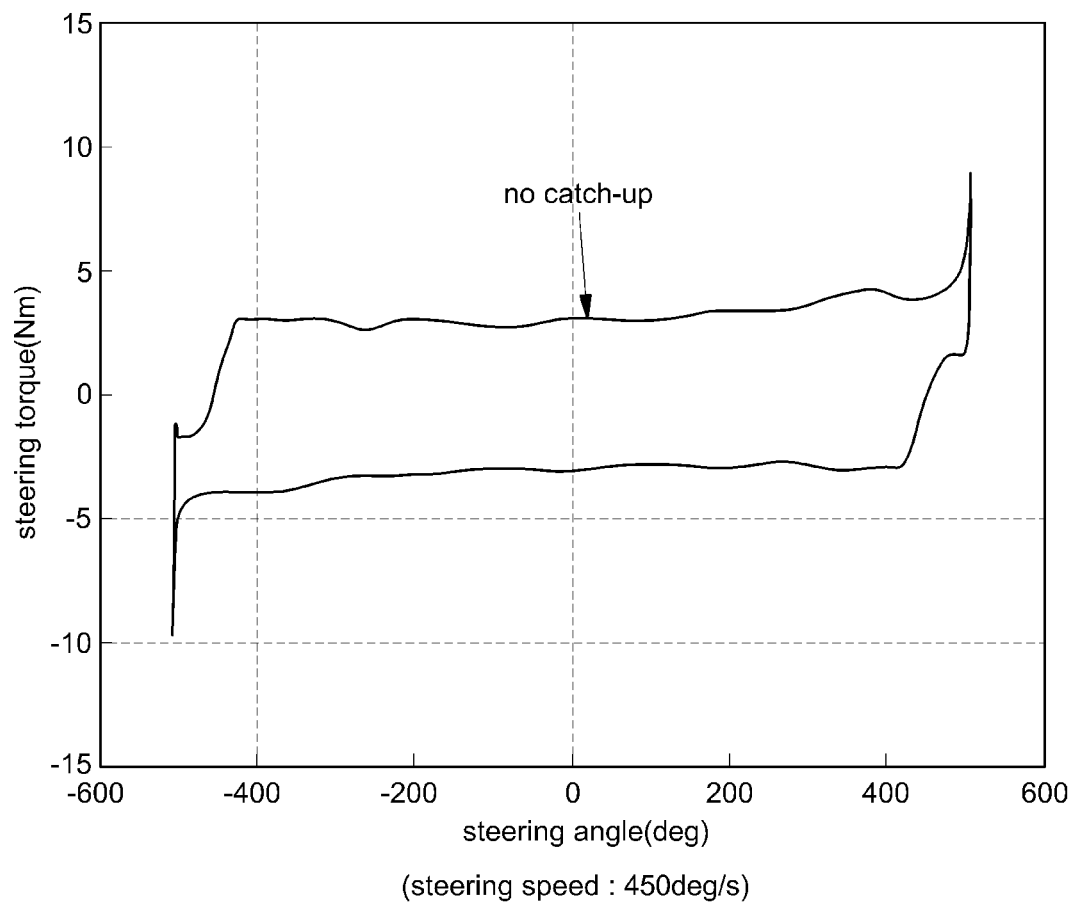
FIGS. 2 and 3 are hysteresis curves showing steering torque according to steering angle at different steering speeds according to the related art.
Figure 3:
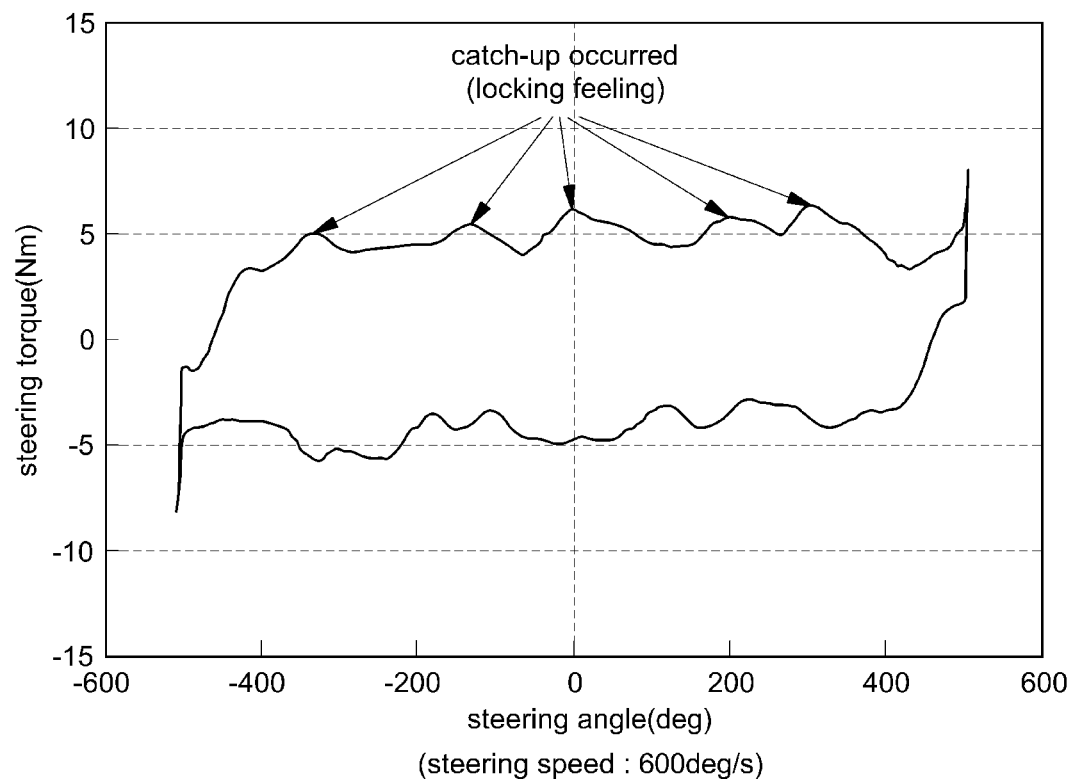

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereafter, exemplary embodiments of the present invention will be described in detail with reference to the accompanying drawings for those skilled in the art to be able to easily achieve the present invention. However, the present invention is not limited to the exemplary embodiments described herein and may be implemented by other ways.

Catch-up that occurs in a motor-driven power steering system (hereafter, referred to as an MDPS system) is described in detail to help understand the present invention. According to an MDPS system, a current characteristic that is applied to a steering motor may be freely tuned, and thus a large steering assist force is generated by increasing motor current and motor output when a vehicle is stopped, whereby the steering force that is applied by a driver to turn a steering wheel is reduced so that the weight feeling of the steering wheel decreases. Accordingly, when a driver turns a steering wheel fast with one hand, the rotational speed of the motor is unable catch up with or reach the driver-steering speed and the steering force is rapidly increased, which is referred catch-up.

However, according to a hydraulic power steering (HPS) system, the steering force is usually about 4 Nm or greater on a flatland for the characteristics of a mechanical valve, so a slight heavy feeling is provided, as compared with the MDPS system. The steering feeling is set heavy and a relatively substantial steering force is required in comparison to the MDPS system, and thus even when a driver wants to turn a steering wheel rapidly with one hand with a vehicle stopped, it is difficult to turn the steering wheel as rapidly as the rotational speed of the MDPS system. However, for this reason, catch-up in which a steering force is rapidly increased during steering does not often occur in the hydraulic power steering system. However, when the flow rate of a power steering pump is unable to reach catch up with the piston speed of a steering gear, catch-up may occur in the hydraulic power steering system.

Figure 4:
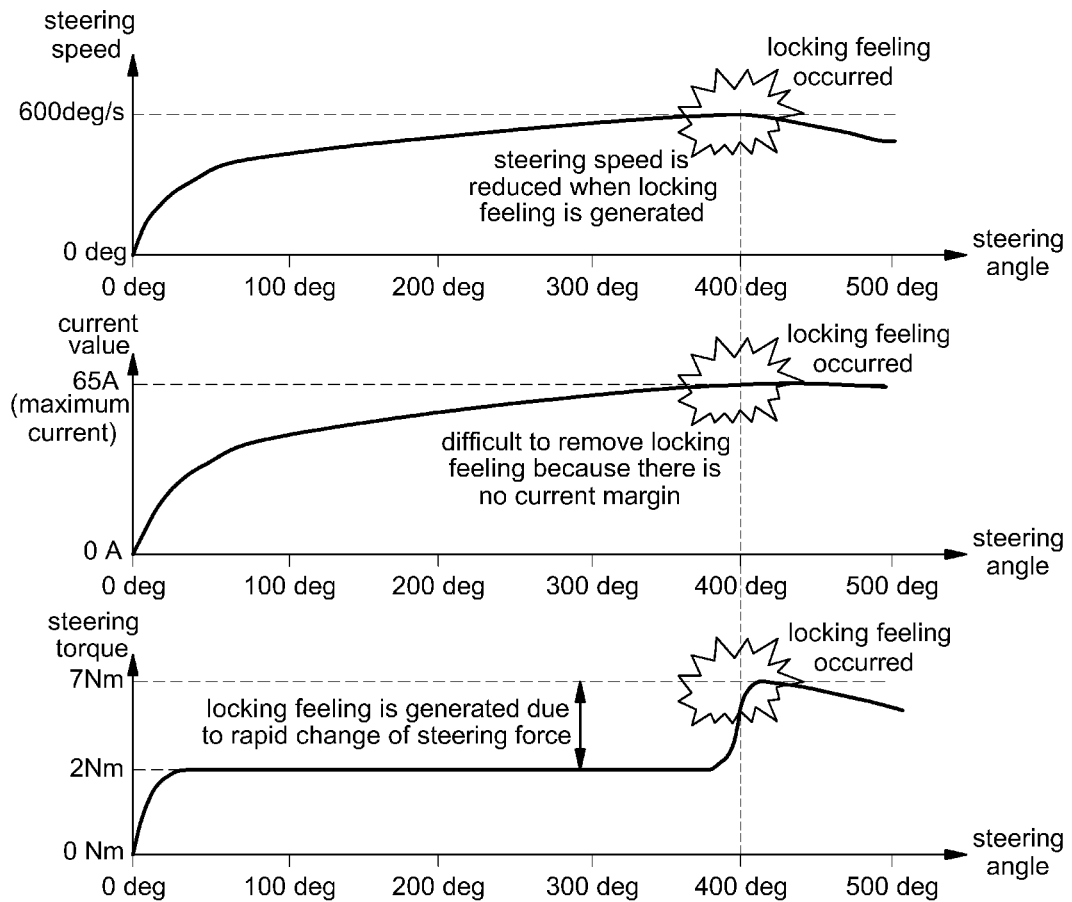
FIG. 4 is an exemplary diagram showing states of a steering speed, motor current, and steering torque according to a steering angle when catch-up occurs in motor driven power steering (MPDS) system.

FIG. 4 is an exemplary diagram showing states of a steering speed, motor current, and steering torque according to a steering angle (e.g., the angle of a steering wheel turned by a driver) when catch-up occurs in an MDPS system. When a driver rapidly turns or otherwise maneuvers a steering wheel with a vehicle stopped, for example, a driver turns a steering wheel rapidly with one hand with a vehicle stopped, the vehicle speed increases and maximum current is applied to a motor at a specific steering angle, for example, about 400° and the driver experiences a locking feeling due to catch-up. The locking feeling, which is a feeling that is generated due to catch-up when a driver operates a steering wheel, is when a steering wheel is not smoothly turned and is suddenly locked due to a substantial steering force being instantaneously required when the steering wheel is turned due to catch-up.

Referring to FIG. 4, when a driver turns a steering wheel rapidly with a vehicle stopped, the steering speed increases and reaches a steering angle of about 400° at a steering speed of about 600 deg/s, maximum current of about 65 A is applied to a steering motor. In particular, there is no current margin that may be applied to the steering motor, and thus, the steering torque is unable to additionally output greater torque. Accordingly, a substantial steering torque of about 7 Nm is instantaneously required while the driver operates the steering wheel with steering torque of 2 Nm, thus causing the driver to sense the locking due to rapid changes of steering torque and steering force.

When the locking feeling or sensation is generated, the steering speed is reduced, and in the related art, there is no margin that can be additionally applied o the steering motor, and thus, the steering feeling is difficult to remove or release. Accordingly, there is a need for a control technology that may effectively reduce and prevent catch-up that occurs due to rapid steering, as described above, when a vehicle equipped with a MDPS system is stopped.

The present invention additionally provides a catch-up reduction logic that may prevent and reduce catch-up and a locking feeling described above to a control logic of an MDPS system, and as described above, in a process of determining a condition for avoiding catch-up and a process of controlling steering motor current to reduce catch-up. The catch-up reduction logic of the present invention is configured to artificially adjust a steering force based on a steering speed with a vehicle stopped, thereby avoiding the condition causing a rapid locking feeling and preventing catch-up.

Figure 5:
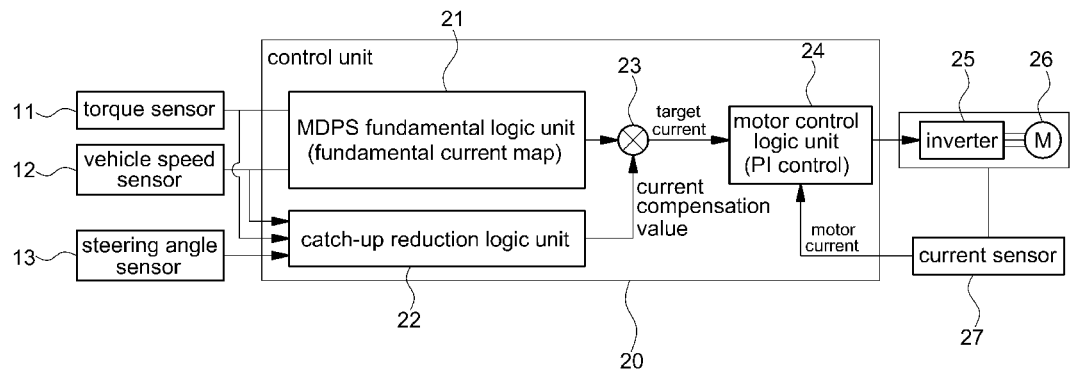
FIG. 5 is a block diagram showing the configuration of a motor-driven power steering system according to an exemplary embodiment of the present invention.

FIG. 5 is a block diagram showing the configuration of an MDPS system according to an exemplary embodiment of the present invention. The MDPS system may include a control system, particularly, a control system that operates a steering motor 26 based on driver-steering input information and vehicle state information, and the control system may include a plurality of sensors configured to collect the driver-steering input information and the vehicle state information.

In other words, the control system of the MDPS system may include: sensors such as a torque sensor 11 configured to detect steering torque that is applied to a steering wheel 1 by a driver, a vehicle speed sensor 12 configured to detect a vehicle speed, and a steering angle sensor 13 configured to detect a steering angle when a driver operates the steering wheel; and a controller (MDPS ECU) 20 configured to output a motor control signal based on information collected and acquired through the sensors.

Particularly, the controller 20 may be configured to receive and acquire steering input information (e.g., steering wheel operation state information) by a driver such as steering torque, a vehicle speed, a steering angle, and a steering angular speed (e.g., steering speed), and vehicle state information such as vehicle speed from the sensors 11, 12, and 13 to adjust operation and output of the steering motor 26. The steering angular speed, which is an angular velocity of a steering wheel that is acquired through a separate sensor or a differential signal of a steering angle sensor signal (a steering angle signal), refers to the speed of a steering wheel turned by a driver, that is, a steering speed.

Further, as described below, to adjust current that is applied to the steering motor 26, that is motor current, the controller 20 may be configured to determine target current and perform PI control to adjust the current that is applied to the steering motor to correspond to the determined target current, and accordingly, the sensors may further include a current sensor 27 configured to detect the motor current. In other words, the controller 20 may be configured to perform PI control on the current that is applied to the steering motor 26, using a signal from the current sensor 27 configured to detect the current that is applied to the steering motor 26 as a feedback signal. Further, the MDPS system may include a motor unit configured to generate and output a steering assist force based on a control signal output from the controller and the motor unit may include the steering motor (MDPS motor) 26 and an inverter 25 configured to operate the steering motor.

In the control system according to an exemplary embodiment of the present invention, the controller 20 may include a MDPS fundamental logic unit 21 configured to calculate motor current from a fundamental current map, using steering torque detected by the torque sensor 11 and a vehicle speed detected by the vehicle speed sensor 12. Further, the control system of the present invention may include a catch-up reduction logic unit 22, a compensation unit 23 configured to calculate a target value of motor current compensated for reducing catch-up, that is, final target current, and a motor control logic 24 configured to output a control signal for applying the final target current calculated by the compensation unit 23 to the steering motor 26. Notably, a controller may be programmed to specifically execute the operations of the various logic units described herein.

The compensation unit 23, as described below, may be configured to calculate the final target current by compensating for the motor current calculated by the MDPS fundamental logic unit 21 based on the current compensation value determined by the catch-up reduction logic unit 22. Further, the catch-up reduction logic unit 22 may be configured to determine a target steering speed based on the information collected and acquired from a vehicle through the sensors 11, 12, and 13, and determine whether it is a condition for avoiding catch-up. In other words, the logic unit may be configured to determine whether the target steering speed corresponds to a condition for avoiding catch-up.

The condition for avoiding catch-up in the present invention may include a condition in which a vehicle speed is low under a set vehicle speed (e.g., about 20 km/h) and a condition in which the driver-steering speed is greater than a set level. For example, the condition for avoiding catch-up may include a case in which the vehicle speed is decreased and then the vehicle is stopped (by an operation of the driver/brake pedal engagement) and then a steering wheel is turned with one hand faster than the set level to park the vehicle.

As described above, there is some degree of load in the steering motor 26 of the MDPS system, but when the maximum speed of the steering motor 26 is unable to catch up with the driver-steering speed, a locking feeling may be suddenly generated by catch-up. Accordingly, in the present invention, when the steering speed increases over the set level, that is, as described above, a critical speed that corresponds to a predetermined ratio (e.g., less than 100%, for example, about 90%) to the target steering speed, the motor current may be adjusted to be limited to a reduced limit current value, thereby reducing the assist torque (e.g., steering assist torque) and the steering assist force output from the steering motor 26.

Limiting the motor current to the reduced limit current value may include reducing the current applied to the steering motor 26 through compensation not to exceed the reduced limit current value and may include compensating for the target value of the motor current to a reduced value such that the motor current may be limited to the reduced limit current value. Accordingly, the driver experience a heavy sensation of the steering wheel and the steering speed may be unable to reach a limit, thereby preventing catch-up.

As described above, the current that is applied to the steering motor 26 may be limited and reduced, the assist torque and the steering assist force output from the steering motor may be decreased, and accordingly, a larger steering force and larger steering torque is required for the steering wheel to be turned (e.g., by a driver). Therefore, as the required steering force and steering torque are increased, the steering wheel weight (e.g., heavy) sensation increases when turning the steering wheel, and thus, the driver may be induced to decrease the speed of operating the steering wheel, that is, the steering speed.

Figure 6:
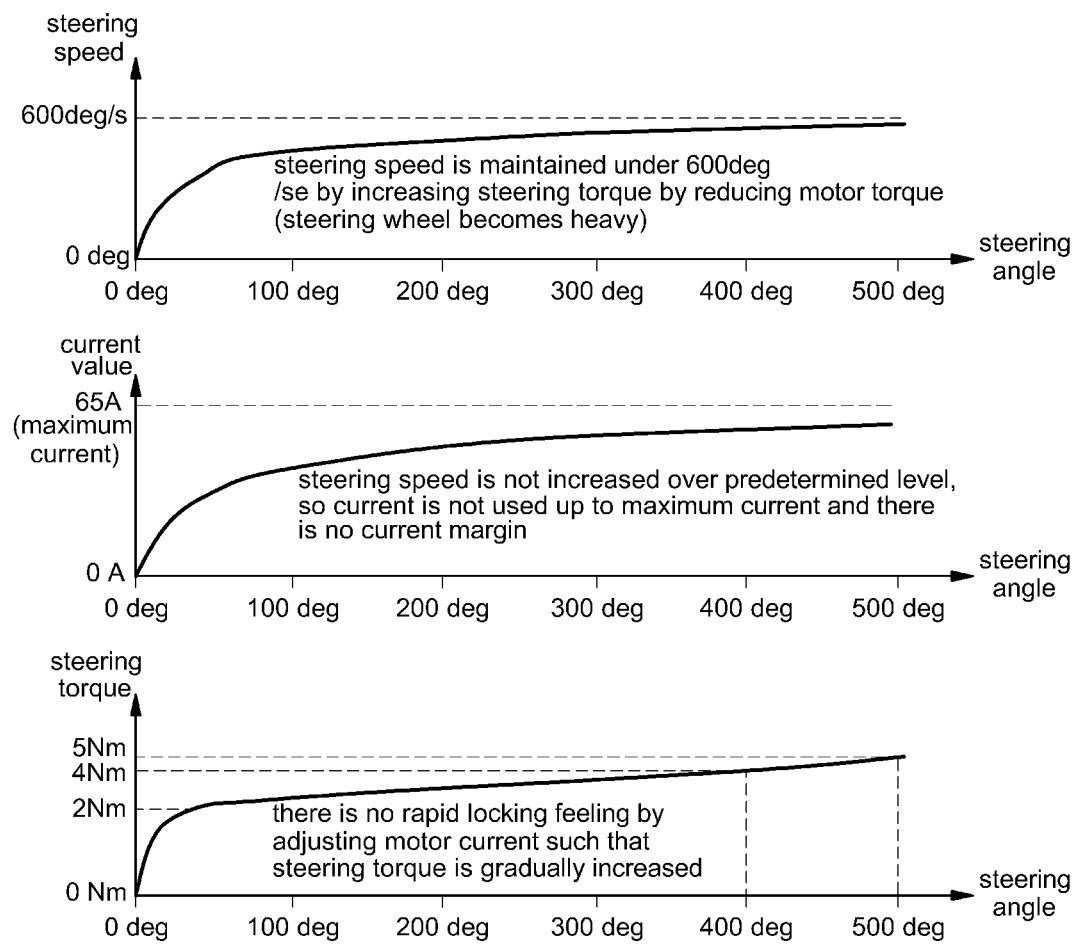
FIG. 6 is an exemplary diagram showing the states of a steering speed, a motor current, and steering torque according to a steering angle according to an exemplary embodiment of the present invention.

Referring to FIG. 6, according to the present invention, the steering torque applied by a driver may be increased by reducing the motor current in the MDPS system when the steering wheel is operated, and thus, the driver feels the steering wheel is heavy when turning the steering wheel. Accordingly, the driver-steering speed may be maintained at a predetermined level, for example, at about 600 deg/s or less. Accordingly, the steering speed may not increase over a predetermined level and the motor current may not be used up to the maximum current (65 A), and thus, there is a current margin that may additionally increase the current. Further, since the steering torque is gradually increased by adjusting the motor current, a rapid locking feeling may be prevented.

Figure 7:
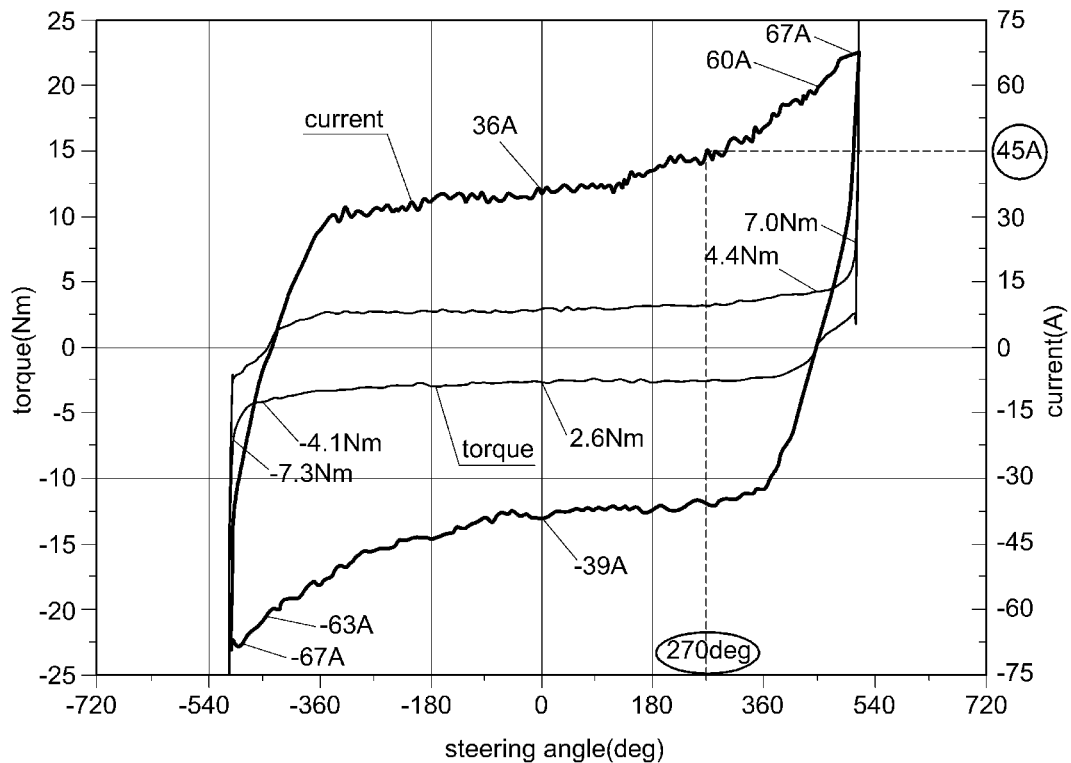
FIG. 7 is an exemplary diagram showing setting data in which a required system current value according to a steering angle is set according to an exemplary embodiment of the present invention.

Meanwhile, the MDPS system may be configured to monitor a steering angle in real time when a driver steers a vehicle and a required system current value at the steering angle and FIG. 7 shows current setting data in which a required system current value according to a steering angle is set to monitor the required system current. The current setting data shown in FIG. 7 is particular data of the MDPS system, and a required-system current may be obtained and set in advance for each steering angle through a test and the current setting data may be stored in advance in the catch-up reduction logic unit 22 of the controller 20 to be used later. In particular, the current setting data may be stored in a memory of the controller 20.

The catch-up reduction logic unit 22 may be configured to determine the required-system current value that corresponds to the current steering angle by a driver that is a detection value by the steering angle sensor 13, using the current setting data shown in FIG. 7. For example, assuming that the current setting data shown in FIG. 7 was obtained from an MDPS system in which a motor of DC 65 A is used and the reduction ratio of 16.33:1, the required system current value may be determined as 45 A when the steering angle is 270 deg in the MDPS system in which a motor of DC 65 A is used and the reduction ratio of 16.33:1.

The MDPS system may be configured to monitor the required system current in real time at a steering angle when a driver steers a vehicle. Further, the catch-up reduction logic unit 22 may be configured to determine a target steering speed at the current steering angle, using reduction ratio information of the MDPS system and motor performance data from the required system current obtained through the monitoring process described above.

Figure 8:
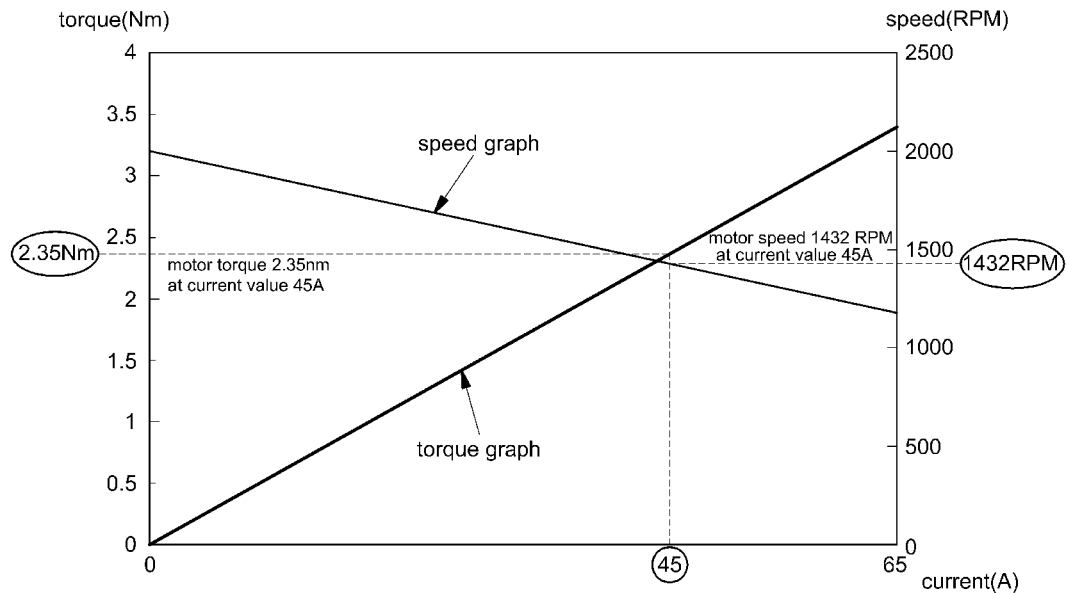
FIG. 8 is an exemplary diagram showing motor performance data according to an exemplary embodiment of the present invention.

FIG. 8 is an exemplary diagram showing motor performance data that may be used in the present invention and shows a performance graph of a motor of DC 65 A which is an example of a steering motor. The performance graph of a motor may include a speed graph showing a motor speed (RPM) according to a required system current value (A) and may further include a torque graph showing motor torque (Nm) according to the required system current value (A).

According to the motor performance data shown in FIG. 8, when the steering angle is 270°, the motor speed and motor torque corresponding to a required system current value 45 A are 1432 RPM and 2.35 Nm, respectively. When the motor speed and motor torque corresponding to a required system current value are obtained through the catch-up reduction logic unit 22, system torque for the entire MDPS system and a maximum system speed corresponding to the system torque may be obtained using a reduction ratio from the motor speed and the motor torque.

For example, when the reduction ratio of the MDPS system is 16.33:1, the catch-up reduction logic unit 22 may be configured to determine the system torque and the maximum system speed, using the reduction ratio from the motor speed (=1432 RPM) and the motor torque (=2.35 Nm), as follows:

system torque=motor torque×reduction ratio=2.35×16.33=38.4 Nm maximum system speed=motor speed÷reduction ratio=1432÷16.33=88 RPM=526 deg/s As a result, when a driver steers a vehicle, that is, turns the steering wheel faster than 526 deg/s, catch-up may occur. The motor performance data shown in FIG. 8 is obtained and set through a test on a corresponding motor and may be input and stored in advance in the catch-up reduction logic unit 22 to be used later.

As described above, according to the present invention, the catch-up reduction logic unit 22 may be configured determine a required system current value that is required by the MDPS system from the current steering angle detected by the steering sensor 13, using the information stored in advance, and may be configured to calculate the system torque and the maximum system speed from the determined required system current value. In other words, the catch-up reduction logic unit 22 may be configured to determine the required system current value that is required for the MDPS system, particularly, the required system current value that corresponds to the current steering angle, using the current setting data, determine the motor speed and motor torque that corresponds to the required system current value, using the motor performance data, and calculate the maximum system speed and the system torque, using the reduction ratio of the MDPS system from the determined motor speed and motor torque.

Meanwhile, according to the present invention, control for inducing a driver to operate a steering wheel at a steering speed less than the maximum system speed may be performed to prevent catch-up, and for this purpose, a target steering speed in consideration of a speed margin ratio may be determined from the maximum system speed. In other words, the target steering speed may be obtained as a speed that corresponds to a predetermined ratio (e.g., less than 100%, for example, 95%) of the maximum system speed.

For example, the speed margin ratio may be set as 5%, and in this case, the catch-up reduction logic unit 22 may be configured to determine a value corresponding to 95% of the maximum system speed as the target steering speed. In the above example, when the maximum system speed was determined as 526 deg/s, 500 deg/s that is 95% of 526 deg/s is determined as the target steering speed when the speed margin ratio is 5%.

Further, the torque applied by a driver may be induced such that the driver-steering speed converges on 500 deg/s to prevent catch-up and a locking feeling in the present invention. Accordingly, setting data for determining steering torque for controlling catch-up corresponding to a target steering speed may be stored in advance in the catch-up reduction logic unit 22, and the setting data may also be referred to as catch-up control-setting data.

Figure 9:
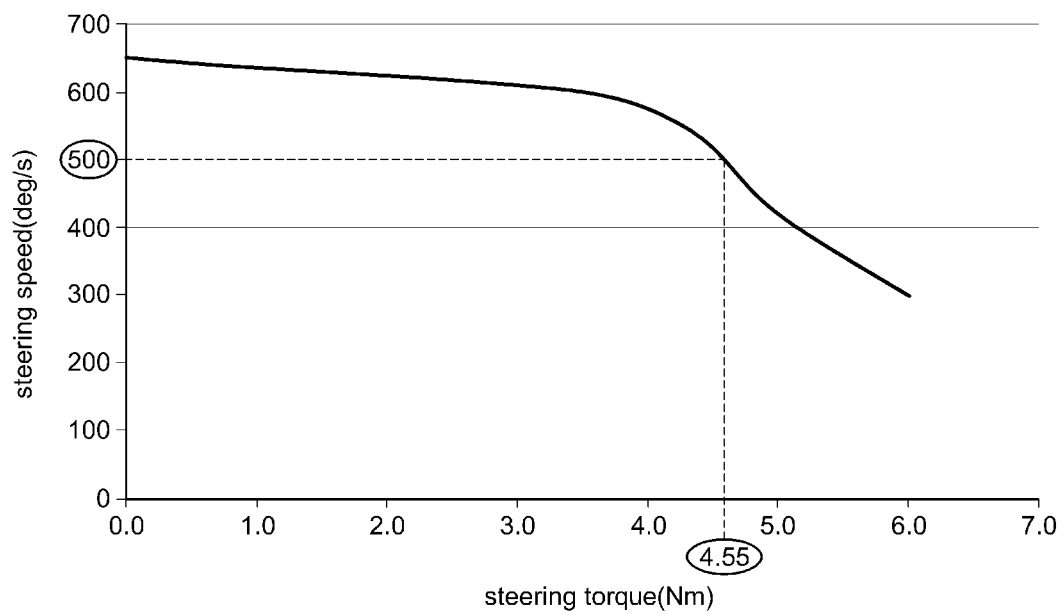
FIG. 9 is an exemplary diagram showing setting data for catch-up control according to an exemplary embodiment of the present invention.

The steering torque may be set as a value according to a target steering speed in the catch-up control-setting data, as shown in FIG. 9, and the catch-up control-setting data is data obtained and set tests and estimations and is used in advance in the catch-up reduction logic unit 22 of the controller 20 to be used later. A steering speed that a driver may maximally apply at corresponding steering torque may be matched and set in the catch-up control-setting data. For example, referring to FIG. 9, the graph shows that the steering wheel 1 is unable to be turned at a speed greater than the steering speed of about 500 deg/s when the steering torque is about 4.55 Nm.

Accordingly, in the present invention, since the steering speed should be less than 500 deg/s regardless of how rapidly the steering wheel is turned or manipulated when the steering torque is 4.55 Nm, motor current for assisting steering may be adjusted to change the steering torque applied to the driver to correspond to 4.55 Nm when the driver turns the steering wheel to 270°, that is, the steering torque detected by the torque sensor 11 becomes 4/55 Nm. As a result, since the steering speed limit is about 500 deg/s even when the driver turns the steering wheel rapidly, the maximum system speed (e.g., about 526 deg/s in the above example) is unable to be reached which thus prevents catch-up from occurring.

Figure 10:
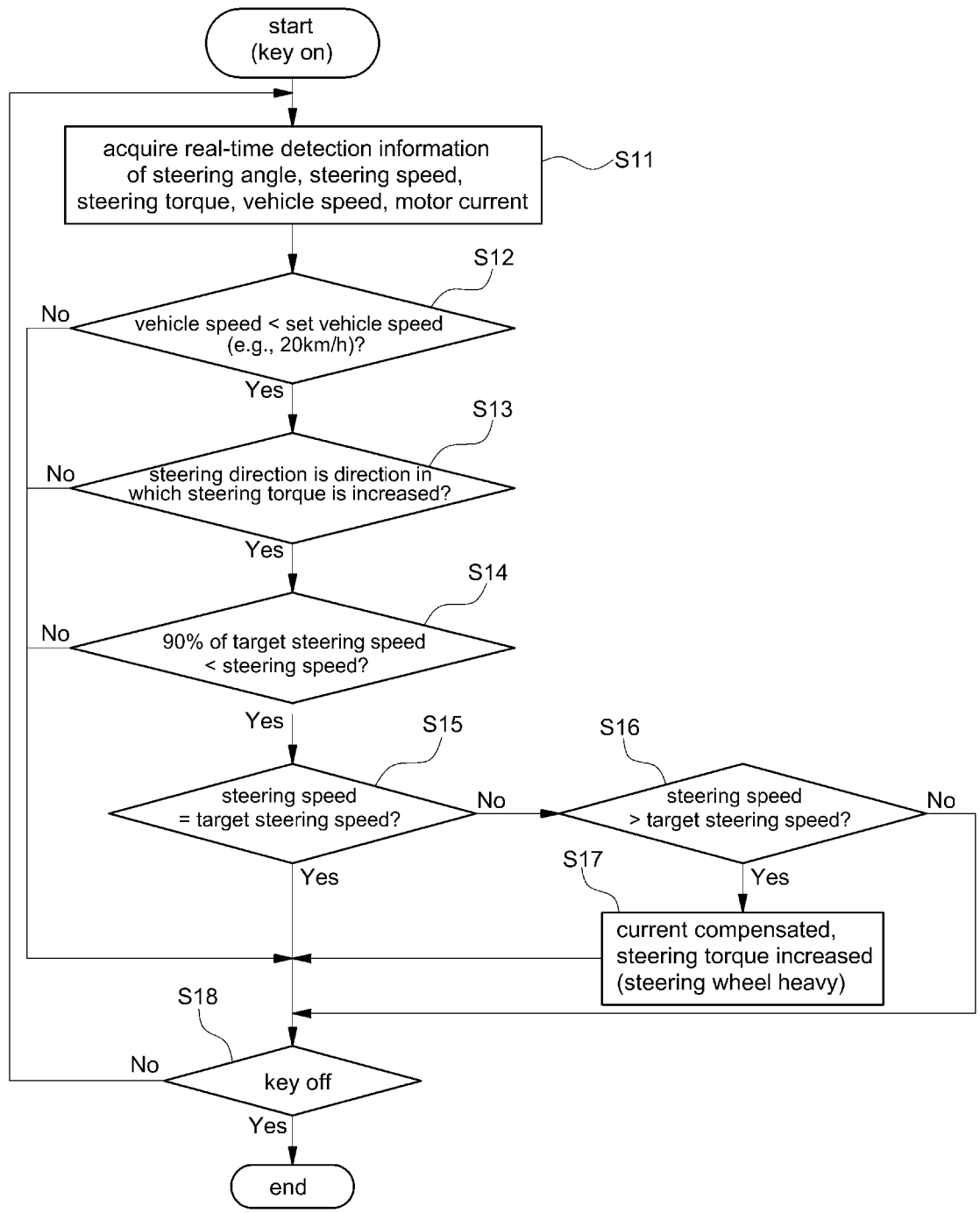
FIG. 10 is a flowchart showing a control process for reducing catch-up of a MDPS system according to an exemplary embodiment of the present invention.

Furthermore, FIG. 10 is a flowchart showing a control process for reducing catch-up in the MDPS system according to the present invention, and when an engine is started (Key On), the control process of FIG. 10 may be performed. When an engine is started and the control process is started, the controller 20 may be configured to receive information collected from the vehicle, that is, driver-steering input information and vehicle state information detected by the sensors 11, 12, and 13 (S11).

The driver-steering input information may include a steering angle detected by the steering angle sensor 13, a steering speed obtained based on a signal from the steering angle sensor 13, and steering torque detected by the torque sensor 11, and the vehicle state information may include a vehicle speed detected by the vehicle speed sensor 12. Further, the controller 20 may be configured to receive a signal from the current sensor 27 detecting current that is applied to the steering motor 26, as a feedback signal for operating the steering motor.

As described above, the controller 20, in detail, the catch-up reduction logic unit 22 of the controller may be configured to collect and acquire necessary information from the vehicle through the sensors 11, 12, 13, and 27, and determine a target steering speed. The controller may then be configured to determine whether the steering speed satisfies a catch-up avoidance condition that requires current control for reducing catch-up, using the information collected and acquired through the sensors (S12, S13, and S14). The steps are separately described in more detail. First, the catch-up reduction logic unit 22 of the controller 20 may be configured to determine whether the current vehicle speed is less than a set vehicle speed by comparing the current vehicle speed detected by the vehicle speed sensor 22 with the set vehicle speed (S12).

When the catch-up reduction logic unit 22 determines that the current vehicle speed is less than the set vehicle speed, the current control process for reducing catch-up may be performed. The set vehicle speed, as shown in FIG. 10, may be about 20 km/h, and current control for reducing catch-up may be performed when the vehicle speed is less than about 20 km/h that is not an emergency danger avoidance condition.

The catch-up reduction logic unit 22 may be configured to determine whether the vehicle is steered in a direction in which steering torque is increased with a change of a steering angle, using the steering angle detected by the steering angle sensor 13 and the steering torque detected by the torque sensor 11 (S13). When the catch-up reduction logic unit 22 determines that the vehicle is steered in a direction in which the steering torque is increased with a change of the steering angle, the current control performance for reducing catch-up may be performed.

The state in which the vehicle is steered in a direction in which steering torque is increased with a change of a steering angle, for example, may include the state in which the absolute value of steering torque is gradually increased when a driver turns the steering wheel to one of the left and right from an on-center position. In other words, the state in which a driver turns the steering wheel 1 to the right from the on-center position, thereby positive steering torque is increased, or a driver turns the steering wheel to the left from the on-center position, thereby negative steering torque is increased.

Further, when a driver turns the steering wheel 1 back toward the on-center position after turning the steering wheel such that torque is increased, that is, when a driver turns the steering wheel to one of the left and right and the turn the steering wheel back toward the on-center position, it may be generally considered as a state in which the steering wheel is turned in a direction in which torque is reduced. When a vehicle is steered in a direction in which steering torque is reduced, the current that is used by the motor and the system is reduced, and thus, a current margin may be sufficient and catch-up may be prevented from occurring, and accordingly, the current control process may be omitted. Therefore, the next current control process for reducing catch-up may be performed only when the vehicle is steered in the direction in which the steering torque is increased.

When the driver-steering speed reaches a predetermined level of the target steering speed, the catch-up reduction logic unit 22 may be configured to compare the driver-steering speed with a critical speed that corresponds to a predetermined ratio of the target steering speed, for example, a critical speed that corresponds to about 90% of the target steering speed (S14). When the target steering speed is greater than the critical speed, the catch-up reduction logic unit 22 may perform the current control for reducing catch-up.

As described above, the condition for avoiding catch-up may include a condition in which the current vehicle speed is less than a set vehicle speed, a condition in which a vehicle is steered in a direction in which steering torque is increased, and a condition in which the driver-steering speed is greater than a critical speed that corresponds to a predetermined ratio of a target steering speed, and the catch-up reduction logic unit 22 may be configured to determine that the condition for avoiding catch-up is satisfied when all of the conditions are satisfied. Consequently, when the three conditions are all satisfied, the catch-up reduction logic unit 22 may perform the current control for reducing catch-up.

In the present invention, it may be possible to start the current control for reducing catch-up when the steering speed, which is the speed of a steering wheel turned by a driver and is monitored using the steering angle sensor 13 to converge on the target speed (e.g., a speed that corresponds to about 95% of the maximum system speed), reaches about 90% of the target steering speed. In the current control process for reducing catch-up, the monitor current may be increased or decreased to cause the driver-steering speed to converge to the target steering speed by monitoring in real time the driver-steering speed obtained from a signal from the steering sensor 13.

As described above, when the target steering speed is determined, as show in FIG. steering torque for controlling catch-up that corresponds to the determined target steering speed may be determined, using the setting data for controlling catch-up. Further, to adjust the driver-steering torque to the steering torque for controlling catch-up, it may be possible to increase or decrease the motor current, and accordingly, it may be possible to adjust the driver-steering speed to converge with the target steering speed.

When the motor current is adjusted, as described above, the assist torque (e.g., steering assist torque) and the steering assist force output from the steering motor 26 may be adjusted. Further, as the assist torque from the steering motor 26 is adjusted, the speed of the steering wheel turned by the driver, that is, the driver-steering speed may be induced to the condition in which catch-up does not occur.

Since the condition in which the current control for reducing catch-up is started is the condition in which the driver-steering speed is greater than a critical speed, the driver-steering speed should be reduced to prevent catch-up. Accordingly, by reducing the assist torque (e.g., steering assist torque) and the steering assist force from the steering motor such that the driver uses greater force to turn the steering wheel, that is, an increased steering torque and steering force are required, the driver may be induced to reduce the steering speed.

When an increased steering torque and steering force are required for turning the steering wheel by reducing the assist torque from the motor through the control of motor current, the driver needs to turn the steering wheel with greater torque and force, and thus, the driver-steering speed, that is, the speed of the steering wheel turned by the driver may be induced to decrease. In the current control process, that is, the current control process for reducing catch-up, the motor current may be adjusted to cause the driver-steering speed to reach the target steering speed that is the condition in which catch-up does not occur (e.g., catch-up may be avoided). In other words, the motor current may be increased or decreased in real time such that the monitored driver-steering speed converges to the target steering torque, for example, that is about 95% of the maximum system speed.

According to an exemplary embodiment, the catch-up reduction logic unit 22 may be configured to perform the current control process for reducing catch-up when a driver turns a steering wheel rapidly and the steering speed increases over the target steering speed. As described above, the catch-up reduction logic unit 22 may be configured to increase or decrease the monitor current to adjust the steering torque of a driver detected by the torque sensor 11 to be the steering torque for controlling catch-up. Accordingly, the catch-up reduction logic unit 22 may be configured to determine a current compensation value as a value that corresponds to the difference between the driver-steering torque and the steering torque for controlling catch-up.

Alternatively, as shown in FIG. 10, the catch-up reduction logic unit 22 may be configured to reduce the limit current value by a predetermined amount less than the previous value and then perform the current control for limiting the motor current to the reduced limit current value when a driver turns a steering wheel rapidly and the steering speed increases over the target steering speed (S16 and S17). Accordingly, it may be possible to reduce the monitor current, so the assist torque from the steering motor 26 is reduced such that a substantial force is required to operate the steering wheel 1, whereby it may be possible to naturally reduce the driver-steering speed.

The catch-up reduction logic unit 22 may be configured to determine a current compensation value for limiting the motor current to the reduced limit current value in the process. The compensation unit 23 may then be configured to compensate for the motor current obtained for operating the steering motor in a common MPDS system, using the current compensation value determined by the catch-up reduction logic unit 22, thereby determining the compensated motor current as the final target current. The motor current not compensated yet may be motor current determined based on the fundamental current map from the steering torque and the vehicle speed detected by the sensors 11 and 12 in the MDPS fundamental logic unit 21.

Alternatively, the motor current not compensated yet may be motor current obtained by additionally compensating for the motor current determined based on the fundamental current map through torque change rate control, inertia control, friction control, damping control, restoring control, and motor anti-overheat control (OHP). The motor control logic 24 of the controller 20 may be configured to output a control signal for applying the final target current compensated by the compensation unit 23 to the steering motor 26.

Further, the motor control logic unit 24 may be configured to output a control signal for performing PI control on the motor current based on a feedback signal that is a signal from the current sensor 27 to apply the final target current to the steering motor 26, that is, the motor current that is applied to the steering motor 26 corresponds to the final target current. Accordingly, the inverter 25 of the motor unit may be operated in response to the control signal output from the motor control logic unit 24, and the steering motor 26 may be operated and the assist torque that is the output from the steering motor may be adjusted by the current that is applied through the inverter 25.

Referring to FIG. 5, motor current may be calculated using the fundamental current map from driver-steering input information and vehicle state information by the MDPS fundamental logic unit 22, and the motor current may be compensated by the compensation unit 23 using the current compensation value calculated by the catch-up reduction logic unit 22. Thereafter, the engine may be stopped (Key Off) (S18), the control process for reducing catch-up of FIG. 10 may be terminated, but the engine is in operation, and the control process of FIG. 10 may be repeated.

Therefore, according to the control apparatus and method for reducing catch-up of the present invention, since it may be possible to maximize the performance of the MDPS system, using an inexpensive motor, the manufacturing cost may be reduced. In other words, since it may be possible to effectively reduce or prevent catch-up that occurs at a high steering speed with a vehicle stopped, the commercial value of a vehicle may be improved and an inexpensive DC motor may be used without using an expensive motor, which may contribute to reducing the manufacturing cost.

In particular, since the rotational speed of a DC motor is low in comparison to a BLAC motor using field-weakening control, a locking feeling due to catch-up at a high steering speed with a vehicle stopped may occur, and thus, an expensive BLAC motor was used in the related art to solve this problem. However, when the control apparatus and method according to the present invention are applied, it may be possible to reduce or prevent catch-up even using an inexpensive DC motor.

Further, as shown in FIGS. 4 and 6, according to the control apparatus and method of the present invention, since the steering force may be artificially controlled in accordance with the steering speed when a vehicle is stopped, it may be possible to prevent catch-up by avoiding a rapid locking feeling generation condition. A driver may turn the steering wheel more smoothly compared to the related art, and thus, the commercial value of a vehicle may be be improved. In particular, as shown in FIG. 6, since the steering margin is secured and the steering force is gradually increased by adjusting motor current such that the maximum current is not reached when the steering speed is increased, it may be possible to turn a steering wheel without a locking feel. The used current may also be reduced, so OHP (Over Heat Protection) performance may be improved.

When a steering wheel is frequently turned with a vehicle stopped, the MDPS system reduces the output from the motor) such that a substantial force is required to turn a steering wheel to prevent overheating of the motor and the controller, and the logic for adjusting the output from the MDPS system is referred to as an overheating protection logic, that is, an OHP logic. It is generally known that the higher the number of times of operating a steering wheel, the higher the OHP performance before the OHP logic is enteral, and the current that is used by a motor may be reduced in the present invention, and thus, the OHP performance may be improved.

Although exemplary embodiments of the present invention were described above in detail, the spirit of the present invention is not limited thereto and the present invention may be changed and modified in various ways based on the basic concept without departing from the scope of the present invention described in the following claims.

What is claimed is:

1. A control apparatus for reducing catch-up in a motor-driven power steering system, comprising:
a plurality of sensors configured to detect driver-steering input information according to operation of a steering wheel by a driver and vehicle state information; and
a controller including a motor driven power steering (MDPS) fundamental logic unit, a catch-up reduction logic unit, and a compensation unit,
wherein the MDPS fundamental logic unit is configured to determine motor current based on operation of the steering wheel by the driver from the driver-steering input information and the vehicle state information detected by the sensors,
wherein the catch-up reduction logic unit is configured to_;
determine a target steering speed using the driver-steering input information and the vehicle state information detected by the sensors,
determine whether the target steering speed corresponds to a condition for avoiding catch-up, and
determine an electric current compensation value for reducing catch-up using the target steering speed when determining that the target steering speed corresponds to the condition for avoiding catch-up,
wherein the compensation unit is configured to compensate the motor current determined by the MDPS fundamental logic unit with the electric current compensation value determined by the catch-up reduction logic unit,
wherein the controller is configured such that when a steering speed increases over a threshold speed corresponding to a predetermined ratio to the target steering speed, the motor current is limited to a reduced limit current value, thereby reducing a steering assist torque and a steering assist force output from the steering motor such that a current margin is secured and a steering force is gradually increased,
wherein the target steering speed is determined by catch-up control-setting data stored in advance in the catch-up reduction logic unit,
wherein the steering speed is measured by one of the sensors and compared to the catch-up control-setting data so as to limit the steering speed,
wherein the catch-up reduction logic unit is configured to determine a speed that corresponds to a predetermined ratio of a maximum system steering speed as the target steering speed, the predetermined ratio of the maximum system steering speed being less than 100% of the maximum system speed.

2. The control apparatus of claim 1, wherein the sensors include a torque sensor and a steering angle sensor respectively configured to detect steering torque and a steering angle as the steering input device by a driver and a vehicle sensor configured to detect a vehicle speed as the vehicle state information.

3. The control apparatus of claim 1, wherein the catch-up reduction logic unit includes:
current setting data in which a required current value of the motor-driven power steering system is set based on a steering angle; and
motor performance data in which a motor speed is set based on the required current value, and the catch-up reduction logic unit is further configured to:
determine the required current value using the current setting data from a steering angle detected by the steering angle sensor while the steering wheel is turned, and
determine the maximum steering system speed, using the determined required current value and stored reduction ratio information of the motor-driven power steering system.

4. The control apparatus of claim 3, wherein the catch-up reduction logic unit is configured to determine the target steering speed to correspond to 95% of the maximum system steering speed.

5. The control apparatus of claim 1, wherein the catch-up reduction logic unit includes the catch-up control-setting data for executing catch-up in which steering torque for executing catch up is set based on the target steering speed, and is configured to determine a value that corresponds to a difference between driver-steering torque detected by the torque sensor and the steering torque for executing catch-up determined by the catch-up control setting data from the target steering speed, as the electric current compensation value.

6. The control apparatus of claim 1, wherein the catch-up reduction logic unit is configured to reduce a limit current value by a predetermined amount from a previous value and determine the electric current compensation value for limiting motor current to the reduced limit current value, when a driver-steering speed obtained from a signal from the steering angle sensor is greater than the target steering speed.

7. The control apparatus of claim 1, wherein when a driver-steering speed obtained from a signal of the steering angle sensor is greater than the target steering speed, the catch-up reduction logic unit is configured to determine the electric current compensation value for reducing catch-up and the compensation unit is configured to compensate for the motor current using the determined electric current compensation value.

8. The control apparatus of claim 1, wherein the catch-up reduction logic unit is configured to determine that catch-up avoidance is required, when a condition in which a current vehicle speed detected by the vehicle speed sensor as the vehicle state information is less than a set vehicle speed, a condition in which the steering wheel is turned in a direction in which steering torque detected by the torque sensor is increased when a steering angle detected by the steering angle sensor is changed, as the driver-steering input information, and a condition in which a driver-steering speed obtained from a signal from the steering angle sensor is greater than the threshold speed obtained from the target steering speed are all satisfied.

9. The control apparatus of claim 8, wherein the catch-up logic unit is set such that a speed corresponding to a predetermined ratio of the target steering speed is obtained as the threshold speed.

10. A control method for reducing catch-up in a motor-driven power steering system, comprising:
acquiring, by a controller, driver-steering input information and vehicle state information in real time that is detected by a plurality of sensors;
determining, by the controller, motor current based on an operation of the steering wheel by the driver from the detected driver-steering input information and vehicle state information;
determining, by the controller, a target steering speed using the determined driver-steering input information and vehicle state information;

determining, by the controller, whether the target steering speed corresponds to a condition for avoiding catch-up using the target steering speed;

determining, by the controller, an electric current compensation value for reducing catch-up using the target steering speed in response to determining that the target steering speed corresponds to the condition for avoiding catch-up; and compensating, by the controller, the motor current determined by a motor driven power steering (MDPS) fundamental logic unit with the electric current compensation value, wherein the controller is configured such that when a steering speed increases over a threshold speed corresponding to a predetermined ratio to the target steering speed, the motor current is limited to a reduced limit current value, thereby reducing a steering assist torque and a steering assist force output from the steering motor such that a current margin is secured and a steering force is gradually increased, wherein the target steering speed is determined by catch-up control-setting data stored in advance in the controller, wherein the steering speed is measured by one of the sensors and compared to the catch-up control-setting data so as to limit the steering speed, and wherein the controller is configured to determine a speed that corresponds to a predetermined ratio of a maximum system steering speed as the target steering speed, the predetermined ratio of the maximum system steering speed being less than 100% of the maximum system speed.

11. The control method of claim 10, wherein the sensors include a torque sensor and a steering angle sensor respectively configured to detect steering torque and a steering angle as the steering input device by a driver and a vehicle sensor configured to detect a vehicle speed as the vehicle state information.

12. The control method of claim 11, wherein the controller is configured to determine the target steering speed to corresponds to 95% of the maximum system steering speed as the target steering speed.

13. The control method of claim 10, wherein the controller includes:

current setting data in which a required current value is set based on a steering angle; and motor performance data in which a motor speed is set based on the required current value, and is configured to determine the required current value using the current setting data from a steering angle detected by the steering angle sensor while the steering wheel is turned, and is configured to determine the maximum system steering speed, using the determined required current value and stored reduction ratio information of the motor-driven power steering system.

14. The control method of claim 10, wherein the controller includes the catch-up control-setting data for executing catch-up in which steering torque for executing catch up is set based on the target steering speed, and the controller is configured to determine a value that corresponds to a difference between driver-steering torque detected by the torque sensor and the steering torque for executing catch-up determined by the catch-up control-setting data from the target steering speed, as the electric current compensation value.

15. The control method of claim 10, wherein the controller is configured to reduce a limit current value by a predetermined amount from a previous value and determine the electric current compensation value for limiting motor current to the reduced limit current value, when a driver-steering speed obtained from a signal from the steering angle sensor is greater than the target steering speed.

16. The control method of claim 10, wherein when a driver-steering speed obtained from a signal of the steering angle sensor is greater than the target steering speed, the controller is configured to determine the electric current compensation value for reducing catch-up and compensate for the motor current using the determined electric current compensation value.

17. The control method of claim 10, wherein the controller is configured to determine whether a catch-up avoidance is required, when a condition in which a current vehicle speed detected by the vehicle speed sensor as the vehicle state information is less than a set vehicle speed, a condition in which the steering wheel is turned in a direction in which steering torque detected by the torque sensor is increased when a steering angle detected by the steering angle sensor is changed, as the driver-steering input information, and a condition in which a driver-steering speed obtained from a signal from the steering angle sensor is greater than the threshold speed obtained from the target steering speed are all satisfied.

18. The control method of claim 17, wherein the controller is configured to obtain a speed that corresponds to a predetermined ratio of the target steering speed as the threshold speed.

* * * * *